United States Patent
Zhang (10) Patent No.: US 9,749,969 B2
(45) Date of Patent: Aug. 29, 2017

(54) METHOD AND DEVICE FOR MULTIPLE-SERVING-CELL CONNECTIVITY FOR UE AND BASE STATION

(71) Applicant: SHANGHAI LANGBO COMMUNICATION TECHNOLOGY COMPANY LIMITED, Shanghai (CN)

(72) Inventor: XiaoBo Zhang, Shanghai (CN)

(73) Assignee: Shanghai Langbo Communication Technology Company Limited, Shanghai (CN)

( * ) Notice: Subject to any disclaimer, the term of this patent is extended or adjusted under 35 U.S.C. 154(b) by 0 days.

(21) Appl. No.: 15/107,447

(22) PCT Filed: Feb. 12, 2015

(86) PCT No.: PCT/CN2015/072911
§ 371 (c)(1),
(2) Date: Jun. 22, 2016

(87) PCT Pub. No.: WO2015/120807
PCT Pub. Date: Aug. 20, 2015

(65) Prior Publication Data
US 2016/0323833 A1    Nov. 3, 2016

(30) Foreign Application Priority Data
Feb. 14, 2014    (CN) .......................... 2014 1 0052284

(51) Int. Cl.
*H04W 52/02* (2009.01)
*H04W 52/32* (2009.01)
(Continued)

(52) U.S. Cl.
CPC ........... *H04W 52/325* (2013.01); *H04L 5/001* (2013.01); *H04W 52/146* (2013.01);
(Continued)

(58) Field of Classification Search
CPC .......................... H04W 52/0212; H04W 52/02
(Continued)

(56) References Cited

U.S. PATENT DOCUMENTS

| 2013/0084071 A1 | 4/2013 | Chomycz |
| 2015/0282102 A1* | 10/2015 | Kakishima ............ H04W 52/40 370/329 |

(Continued)

FOREIGN PATENT DOCUMENTS

| CN | 102934498 A | 2/2013 |
| CN | 103119989 A | 5/2013 |

OTHER PUBLICATIONS

International Search Report dated Aug. 31, 2015 from International Patent Application No. PCT/CN2015/072911, filed Feb. 12, 2015.

*Primary Examiner* — John J Lee
(74) *Attorney, Agent, or Firm* — Sunstone IP (57) ABSTRACT

A method and a device for multiple-serving-cell connectivity in a UE and in a base station are disclosed in the present invention. Addressing the problem of the PUCCH power reduction that can be caused by PUCCH transmission on a secondary cell during dual-connectivity communication, the present invention provides a solution for PUCCH power reduction during dual-connectivity communication. In one embodiment, when power is reduced, the priority of PUCCH transmission on a secondary cell is lower than the priority of PUCCH transmission on a primary cell. The present invention can ensure PUCCH reception quality on a primary cell, guaranteeing the robustness of UE connectivity. Moreover, the present invention maintains the highest degree of compatibility with present systems.

16 Claims, 5 Drawing Sheets

(51) Int. Cl.
*H04L 5/00* (2006.01)
*H04W 52/14* (2009.01)
*H04W 72/04* (2009.01)

(52) U.S. Cl.
CPC ....... *H04W 72/0413* (2013.01); *H04L 5/0048* (2013.01); *H04L 5/0053* (2013.01); *H04W 52/0212* (2013.01); *Y02B 60/50* (2013.01)

(58) Field of Classification Search
USPC ..... 455/522, 509, 69, 68, 452.1, 67.11, 445, 455/446
See application file for complete search history.

(56) References Cited

U.S. PATENT DOCUMENTS

| | | | |
|---|---|---|---|
| 2015/0319753 A1* | 11/2015 | Chen ...................... | H04L 5/001 370/277 |
| 2015/0350944 A1* | 12/2015 | Chen .................... | H04W 24/10 370/252 |
| 2016/0353507 A1* | 12/2016 | Uemura .............. | H04W 76/064 |

* cited by examiner

METHOD AND DEVICE FOR MULTIPLE-SERVING-CELL CONNECTIVITY FOR UE AND BASE STATION

This application is a U.S. National Phase application under 35 U.S.C. §371 of International Application No. PCT/CN2015/072911, filed on Feb. 12, 2015, and claims benefit to Chinese Patent Application No. CN201410052284.9, filed on Feb. 14, 2014, all of which is hereby incorporated by reference for all purposes. The International Application was published in China on Aug. 20, 2015 as WO2015120807 A2 under PCT Article 21 (2).

BACKGROUND

Technical Field

The present invention is related to a method and a device for uplink power control in a dual-connectivity communication in the mobile communication technique field, and more particular to a scheme for uplink power control in a scenario of a dual-connectivity communication technique adopted in Long Term Evolution (LTE) system.

Related Art

The Release 12 (R12) version of the 3rd Generation Partner Project (3GPP) introduces an issue of a small cell enhancement (SCE). On the basis of R11 research, a solution scheme for a small cell deployment for increasing a communication capacity is researched, especially in a large scale deployment scenario. As a key technique of the SCE, a dual connectivity scheme becomes a research hot spot, i.e. a user equipment (UE) maintains a connection with a primary cell (usually maintained by a macro base station) and a connection with secondary cell (usually maintained by a micro base station) simultaneously. The dual connectivity communication is capable of increasing a communication capacity and a robustness. For example, a communication is maintained through a connection of the macrocell during a handover process between the small cells to avoid the dropped-call, and for another example, an uplink link and a downlink may be connected to different cells to obtain the best linking quality.

When the dual-connectivity is implemented by the different carriers, a character thereof is a carrier aggregation (CA) between eNB. Compared to CA of R11, a return between a macrocell and a small cell of the dual-connectivity communication is non-ideal, i.e. a delay time is not 0. Therefore, a primary base station and a secondary base station in the dual-connectivity are independently capable of scheduling the same one UE, and are capable of receiving a physical uplink control channel (PUCCH) signal simultaneously. However, in the traditional CA, the PUCCH signal is only transmitted on a primary carrier component (PCC).

When a transmitting power of the UE in the dual-connectivity communication exceeds a maximum total transmitting power, how to perform a power reduction for the PUCCH signal transmitted by the cell maintained by the secondary base station is a problem to be solved.

The present invention provides a power reduction scheme for the above problem.

SUMMARY

The present invention discloses a method for multiple-serving-cell connectivity in a UE, wherein the method includes the following steps:

Step A: receiving a downlink signaling of a first serving cell to obtain a first power control parameter;

Step B: transmitting a first PUCCH signal to the first serving cell with a first power in a first sub frame; and Step C: transmitting a second PUCCH signal to a second serving cell with a second power in the first sub frame;

wherein the second power is a smaller value between a difference value and a second ideal power, and the difference value is obtained by subtracting the first power from a maximum total transmitting power.

The first power is a transmitting power of the first PUCCH signal without performing a power reduction, and the second ideal power is a transmitting power of the second PUCCH signal without performing a power reduction. The power is a linear value. The first serving cell is maintained by the primary base station, and the second serving cell is maintained by the secondary base station. The first power control parameter includes a configuration parameter of the first power.

The power reduction indicates that the transmitting power is reduced under the condition that the power exceeds the maximum total transmitting power when simultaneously transmitting the uplink signals on the multiple carriers. It does not include the scenario that the power exceeds the maximum transmitting power when only transmitting the uplink signal on the single carrier.

The character of the above aspect is that when the power reduction is performed, the priority of the PUCCH transmitted to the cell maintained by the secondary base station is lower than the priority of the PUCCH transmitted to the cell maintained by the primary base station. Thus, the advantage is that it is capable of ensuring the receiving quality of PUCCH in the primary base station, thereby ensuring the robustness of the UE connection.

In one embodiment, the first power is determined according to the PUCCH transmitting power scheme designed by the LTE, and the first power transformed to decibel value (the unit is milli-decibel—dBm) is as follows (the detail information may refer to the section 5.1.2.1 of TS36.213):

$$\min \begin{cases} P_{CMAX,x}(i), \\ P_{0\_PUCCH,c} + PL_c + h(n_{CQI,c}, n_{HARQ,c}, n_{SB,c}) + \\ \Delta_{F\_PUCCH,c}(F) + \Delta_{TxD,c}(F') + g_c(i) \end{cases} [dBm],$$

wherein, the power value of the above formula adopts the decibel value, subscript c is an index number of the first serving cell, $P_{CMAX,c}(i)$ is a maximum transmitting power in the first serving cell, configured by the downlink signaling and belonging to the configuration parameter of the first power, $PL_c$ is a path loss of the first serving cell signal detected by the UE, $g_c(i)$ is determined by a close loop power control signaling for the first serving cell, configured by the downlink signaling and belonging to a configuration parameter of the first power, $P_{0\_PUCCH,c}$, $\Delta_{F\_PUCCH,c}$, $\Delta_{TxD,c}(F')$ are determined with the assistance of the downlink signaling and belong to configuration parameters of the first power, $h_c(n_{CQI,c}, n_{HARQ,c}, n_{SR,c})$ is a function related to PUCCH format of the first sub frame in the first serving cell, $n_{CQI,c}$, $n_{HARQ,c}$, $n_{SR,c}$ respectively indicates the number of channel quality indicator (CQI) information bit, the number of hybrid automatic repeat request (HARQ) acknowledge (HARQ-ACK) bit, and scheduling request transmission flag. i is a sub frame index of the first sub frame. It should be noted that in the corresponding formulas of TS36.213, only $P_{CMAX,c}(i)$ and $PL_c$ include subscript c, and other parameters are specified for the primary cell. In the present invention, the secondary cell may also upload the PUCCH signal, and therefore other parameters may also include the subscript c.

In one embodiment, the UE is capable of receiving the close loop power control signaling for the PUCCH on the second serving cell. Except the subscript c being substituted as a cell index corresponding to the second serving cell, the calculation method of the second ideal power is equal to the calculation method of the above first power. The corresponding $P_{CMAX,c}(i)$, $g_c(i)$, $P_{O\_PUCCH,c}$, $\Delta_{F\_PUCCH,c}$, $\Delta_{TxD,c}(F')$ are the configuration parameters of the second ideal power.

In one embodiment, the UE is not capable of receiving the close loop power control signaling for the PUCCH on the second serving cell. The calculation method of the second ideal power is equal to the calculation method of the above first power, except that the subscript c is substituted as a cell index corresponding to the second serving cell, and $g_c(i)$ is 0.

In one embodiment, the first serving cell is a primary serving cell of the UE.

Specifically, according to one aspect of the present invention, the method further includes the following step:

Step D: transmitting a third uplink signal to a third serving cell with a third power in the first sub frame;

wherein, the third uplink signal is a PUSCH with a UCI, the third power is a smaller value between a difference value and a third ideal power, the difference value is obtained by subtracting the first power and the second power from the maximum total transmitting power; the third ideal power is a transmitting power of the third uplink signal without performing the power reduction; the power is a linear value.

In one embodiment, the third ideal power is determined according to the physical uplink shared channel (PUSCH) transmitting power scheme designed by the LTE, and the third ideal power transformed to decibel value (the unit is milli-decibel—dBm) is as follows (the detail information may refer to the section 5.1.1.1 of TS36.213):

$$\min\left\{\begin{array}{l}P_{CMAX,x}(i),\\10\log_{10}(M_{PUSCH,c}(i))+P_{O\_PUSCH,c}(j)+\\ \alpha_c(j)\cdot PL_c+\Delta_{TF,c}(i)+f_c(i)\end{array}\right\}[dBm]$$

wherein, subscript c is a third serving cell index, $P_{CMAX,c}(i)$ is a maximum transmitting power on the third serving cell, $PL_c$ is a path loss of the third serving cell detected by the UE, $M_{PUSCH,c}(i)$ is a bandwidth of PUSCH, g(i) is determined by a close loop power control signaling. $P_{O\_PUSCH,c}(j)$, $\alpha_c(j)$, $\Delta_{TF,c}(i)$, $f_c(j)$ are determined with the assistance of the downlink higher layer signaling. g(i), $P_{O\_PUSCH,c}(j)$, $\alpha_c(j)$, $\Delta_{TF,c}(i)$, $f_c(j)$ are configuration parameters of the third ideal power. i is a sub frame index of the first sub frame.

Specifically, according to the above aspect of the present invention, the method further includes the following step:

Step E: transmitting PUSCH signals $S_1, S_2, \ldots, S_K$ without UCI in the first sub frame to K serving cells $C_1, C_2, \ldots, C_K$ respectively, and with powers $P_1, P_2, \ldots, P_K$ respectively;

wherein, the K serving cells do not comprise the third serving cell. The sum of the power P1, P2, ..., PK does not exceed a difference value obtained by subtracting the first power, the second power and the third power from the maximum total transmitting power. If the step D does not exist, the third power is 0, the k is a positive integer from 1 to K, and the K is a positive integer. The power is a linear value.

Specifically, according to the above aspect of the present invention, the power $P_k$ is the product of the power reduction factors w and $P_k^{ideal}$ of the first sub frame. The $P_k^{ideal}$ is a transmitting power of the $S_k$ without performing the power reduction. The w is configurable.

In one embodiment, the $P_k^{ideal}$ is determined according to the physical uplink shared channel (PUSCH) transmitting power scheme designed by the LTE, and it adopts the same calculation method as mentioned in the above embodiment of the third ideal power, except that the parameters including the subscript c transformed to the parameters corresponding to the serving cell $C_k$. g(i), $P_{O\_PUSCH,c}(j)$, $\alpha_c(j)$, $\Delta_{TF,c}(i)$, $f_c(j)$ are the configuration parameters of the $P_k^{ideal}$.

Specifically, according to one aspect of the present invention, the method before the step C includes the following step:

Step C0: receiving a downlink signaling of a second serving cell to obtain a second power control parameter;

wherein, the second power control parameter comprises a configuration parameter of the second ideal power.

The character of the above aspect is that: the UE receives the downlink signaling of the secondary base station to obtain a power control parameter related to the serving cell maintained by the secondary base station.

Specifically, according to the above aspect of the present invention, the first power control parameter includes:
a configuration parameter of the second ideal power;
a configuration parameter of the third ideal power; and
a configuration parameter of the $P_k^{ideal}$.

The character of the above aspect is that: the UE receives the downlink signaling of the primary base station to obtain a power control parameter related to the serving cell maintained by the secondary base station.

Specifically, according to the above aspect of the present invention, the maximum total transmitting power is a linear value corresponding to 23 dBm.

The present invention discloses a method for connecting multiple-serving-cell connectivity in a base station, and the method includes the following steps:

Step A: transmitting a downlink signaling to indicate a first power control parameter;

Step B: transmitting a backhaul signaling through a backhual link between the base stations to indicate a second power control parameter; and Step C: receiving a first PUCCH signal;

wherein the first power control parameter includes a configuration parameter of a transmitting power of the first PUCCH signal, the second power control parameter includes a configuration parameter of a transmitting power when a transmitter of the first PUCCH signal doesn't perform the power reduction on a receiver of the backhaul signaling.

The present invention discloses a method of a dual-connectivity communication in a base station, and the method includes the following steps:

Step A: receiving a backhaul signaling through a backhual link between the base stations to obtain a second power control parameter;

Step B: transmitting a downlink signaling to indicate the second power control parameter; and Step C: receiving a second PUCCH signal;

wherein the second power control parameter comprises a configuration parameter of a transmitting power when the power reduction for the second PUCCH signal is not performed.

The present invention discloses an user equipment, which includes:

a first module, for receiving a downlink signaling of a first serving cell to obtain a first power control parameter;

a second module, for transmitting a first PUCCH signal to the first serving cell with a first power in a first sub frame; and a third module, for transmitting a second PUCCH signal to a second serving cell with a second power in the first sub frame;

wherein the second power is a smaller value between a difference value and a second ideal power, and the difference value is obtained by subtracting the first power from a maximum total transmitting power. The first power is a transmitting power of the first PUCCH signal without performing a power reduction, and the second ideal power is a transmitting power of the second PUCCH signal without performing a power reduction. The power is a linear value. The first power control parameter includes a configuration parameter of the first power.

In one embodiment, the feature of the above equipment is that the first serving cell is a primary serving cell of the UE.

In one embodiment, the feature of the above equipment is that the equipment further includes:

a fourth module, for transmitting a third uplink signal to a third serving cell with a third power in the first sub frame; and a fifth module, for transmitting PUSCH signals $S_1$, $S_2, \ldots, S_K$ without UCI in the first sub frame to K serving cells $C_1, C_2, \ldots, C_K$ respectively, and with powers $P_1, P_2, \ldots, P_K$ respectively;

wherein the third uplink signal is a PUSCH with a UCI, the third power is a smaller value between a difference value and a third ideal power, the difference value is obtained by subtracting the first power and the second power from the maximum total transmitting power. The third ideal power is a transmitting power of the third uplink signal without performing the power reduction; the power is a linear value. The K serving cells do not include the third serving cells, the k is a positive integer from 1 to K, and the K is a positive integer. A sum of the power $P_1, P_2, \ldots, P_K$ does not exceed a difference value obtained by subtracting the first power, the second power and the third power from the maximum total transmitting power. The power $P_k$ is the product of the power reduction factors w and $P_k^{ideal}$ of the first sub frame. The $P_k^{ideal}$ is a transmitting power of the $S_k$ when the power reduction does not perform. The w is configurable.

The present invention discloses a base station equipment, which includes:

a first module, for transmitting a downlink signaling to indicate a first power control parameter;

a second module, for transmitting a backhaul signaling through a backhual link between the base stations to indicate a second power control parameter; and a third module, for receiving a first PUCCH signal;

wherein the first power control parameter comprises a configuration parameter of a transmitting power of the first PUCCH signal, the second power control parameter comprises a configuration parameter of a transmitting power when a transmitter of the first PUCCH signal doesn't perform the power reduction on a receiver of the backhaul signaling.

The present invention discloses a base station equipment, which includes:

a first module, for receiving a backhaul signaling through a backhual link between the base stations to obtain a second power control parameter;

a second module, for transmitting a downlink signaling to indicate the second power control parameter; and a third module, for receiving a second PUCCH signal;

wherein, the second power control parameter includes a configuration parameter of a transmitting power when the power reduction for the second PUCCH signal is not performed.

For a problem of the power reduction of a PUCCH that may be caused by transmitting the PUCCH on a secondary cell (a cell maintained by a secondary base station) in a dual-connectivity communication, the present invention disclose a scheme for the power reduction of the PUCCH in the dual-connectivity communication. In one embodiment, when the power reduction is performed, a priority of the PUCCH transmitted on a secondary cell is lower than a priority of the PUCCH transmitted on a primary cell (a cell maintained by a primary base station). The present invention is capable of ensuring a receiving quality of the PUCCH on the primary cell, thereby ensuring a robustness of the UE connection. Moreover, the present invention maintains maximum compatibility with present system.

BRIEF DESCRIPTION OF THE DRAWINGS

The above and other exemplary aspects, features and advantages of certain exemplary embodiments of the present invention will be more apparent from the following description taken in conjunction with the accompanying drawings, in which.

DETAILED DESCRIPTION

The following description with reference to the accompanying drawings is provided to explain the exemplary embodiments of the invention. Note that in the case of no conflict, the embodiments of the present invention and the features of the embodiments may be arbitrarily combined with each other.

Embodiment I

Figure 1:
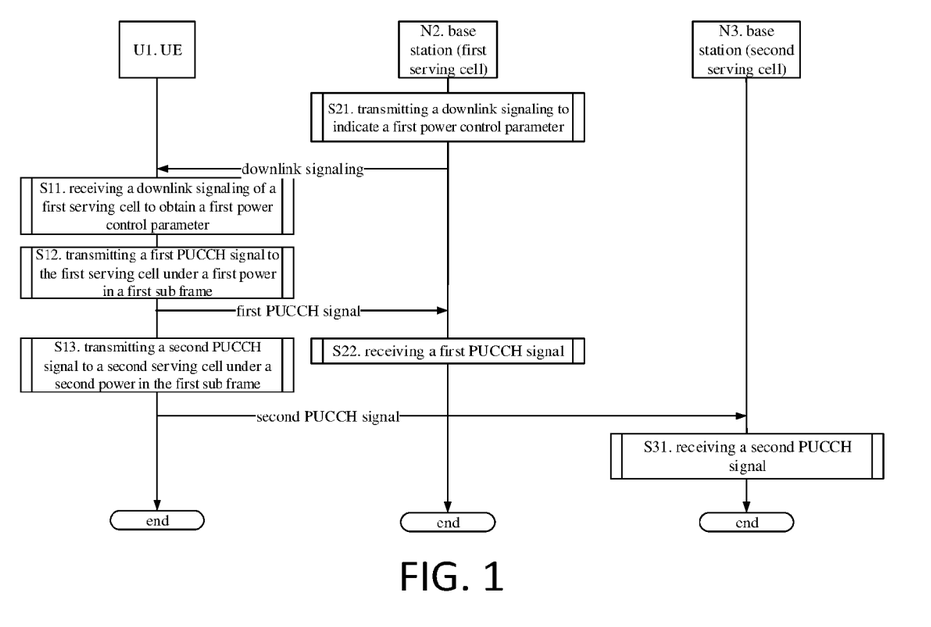
FIG. 1 is a flowchart of transmitting PUCCH signals on a primary cell and a secondary cell simultaneously according to one embodiment of the present invention.

Embodiment I illustrates a flowchart of transmitting PUCCH signals on a primary cell and a secondary cell simultaneously, as shown in FIG. 1. In FIG. 1, the base station N2 is a maintaining base station of the first serving cell, i.e. a primary base station, and the base station N3 is a maintaining base station of the second serving cell, i.e. a secondary base station.

For the UE U1, in step S11, the method involves receiving a downlink signaling of a first serving cell to obtain a first power control parameter; in step S12, the method involves transmitting a first PUCCH signal to the first serving cell under a power $P_1^{PUCCH}$ in a first sub frame; in step S13, the method involves transmitting a second PUCCH signal to a second serving cell under a power $P_2^{PUCCH}$ in the first sub frame.

For the base station N2, in step S21, the method involves transmitting a downlink signaling to indicate a first power control parameter; in step S22, the method involves receiving a first PUCCH signal.

For the base station N3, in step S31, the method involves receiving a second PUCCH signal.

In Embodiment I:

$$P_2^{PUCCH} = \min(P_2^{PUCCH,ideal}(i), P_{Max} - P_1^{PUCCH}(i))$$

wherein $P_{Max}$ is a maximum total transmitting power of the UE U1, $P_2^{PUCCH,ideal}(i)$ is a transmitting power of the second PUCCH signal without performing power reduction in sub frame i, and $P_1^{PUCCH}(i)$ is a transmitting power of the first PUCCH signal without performing the power reduction. The power is a linear value, and i is a sub frame index of the first sub frame.

The calculation method of $P_1^{PUCCH}(i)$ and $P_2^{PUCCH,ideal}(i)$ reuses the calculation method of the PUCCH in the LTE, and a corresponding decibel (unit: dBm) thereof is as follows:

$$\min\begin{Bmatrix} P_{CMAX,x}(i), \\ P_{0\_PUCCH,c} + PL_c + h(n_{CQI,c}, n_{HARQ,c}, n_{SR,c}) + \\ \Delta_{F\_PUCCH,c}(F) + \Delta_{TxD,c}(F') + g_c(i) \end{Bmatrix}[dBm]$$

wherein for $P_1^{PUCCH}(i)$, subscript c is an index number of the first serving cell, and for $P_2^{PUCCH,ideal}(i)$, subscript c is an index number of the second serving cell.

$P_{CMAX,c}(i)$ is a maximum transmitting power on the serving cell c. It is configured by the downlink signaling. $PL_c$ is a path loss of the serving cell c detected by the UE, $g_c(i)$ is determined by a close loop power control signaling for the serving cell c. $P_{0\_PUCCH,c}$, $\Delta_{F\_PUCCH,c}$, $\Delta_{TxD,c}(F')$ respectively indicates that a sum of two configuration parameters, the parameter related to the PUCCH format and the parameter related to the transmitting diversity. They are determined with the assistance of the downlink signaling, $h_c(n_{CQI,c}, n_{HARQ,c}, n_{SR,c})$ is a function related to PUCCH format of the first sub frame on the serving cell c, $n_{CQI,c}$, $n_{HARQ,c}$, $n_{SR,c}$ respectively indicates channel quality indicator (CQI) information bit number, hybrid automatic repeat request (HARQ) acknowledge (HARQ-ACK) bit number, and scheduling request transmission flag. i is a sub frame index of the first sub frame. It should be noted that in the corresponding formulas of TS36.213, only $P_{CMAX,c}(i)$ and $PL_c$ include subscript c, and other parameters are specified by the primary cell. In the present invention, the secondary cell may also upload the PUCCH signal, and therefore other parameters may also include the subscript c. When the subscript c identifies the first serving cell, $P_{CMAX,c}(i)$, $g_c(i)$, $P_{0\_PUCCH,c}$, $\Delta_{F\_PUCCH,c}$, $\Delta_{TxD,c}(F')$ are configuration parameters of $P_1^{PUCCH}(i)$. When the subscript c identifies the second serving cell, $P_{CMAX,c}(i)$, $g_c(i)$, $P_{0\_PUCCH,c}$, $\Delta_{F\_PUCCH,c}$, $\Delta_{TxD,c}(F')$ are configuration parameters of $P_2^{PUCCH}(i)$.

In Embodiment I, the first power control parameter includes the configuration parameters of $P_1^{PUCCH}(i)$.

In a first exemplary embodiment of Embodiment I, the first power control parameter further includes the configuration parameters of $P_2^{PUCCH,ideal}(i)$.

Embodiment II

Figure 2:
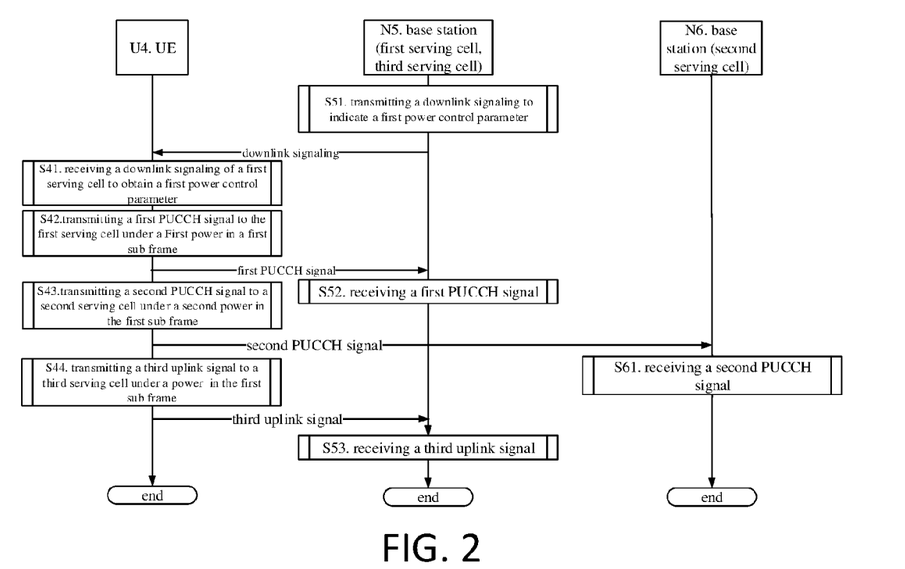
FIG. 2 is a flowchart of transmitting uplink signals on three cells simultaneously according to one embodiment of the present invention.

Embodiment II is a flowchart of transmitting uplink signals on three cells simultaneously, as shown in FIG. 2. In Embodiment II, the base station N5 is a maintaining base station of a first serving cell and a third serving cell, and the base station N5 is a primary base station. The base station N6 is a maintaining base station of a second serving cell, and the base station N6 is a secondary base station.

For the UE U4, in step S41, the method involves receiving a downlink signaling of a first serving cell to obtain a first power control parameter; in step S42, the method involves transmitting a first PUCCH signal to the first serving cell under a power $P_1^{PUCCH}$ in a first sub frame; in step S43, the method involves transmitting a second PUCCH signal to a second serving cell under a power $P_2^{PUCCH}$ in the first sub frame; in step S44, the method involves transmitting a third uplink signal to a third serving cell under a power $P_3^{PUSCH\_UCI}$ in the first sub frame.

For the base station N5, in step S51, the method involves transmitting a downlink signaling to indicate a first power control parameter; in step S52, the method involves receiving a first PUCCH signal on the first serving cell; in step S53, the method involves receiving a third uplink signal on the third serving cell.

For the base station N6, in step S61, the method involves receiving a second PUCCH signal.

In Embodiment II:

$$P_2^{PUCCH} = \min(P_2^{PUCCH,ideal}(i), P_{Max} - P_1^{PUCCH}(i))$$

$$P_3^{PUSCH\_UCI} = \min(P_3^{PUSCH\_UCI,ideal}(i), P_{Max} - P_1^{PUCCH}(i) - P_2^{PUCCH}(i))$$

In Embodiment II, $P_{Max}$ is a maximum total transmitting power of the UE U1, $P_2^{PUCCH,ideal}(i)$ is a transmitting power of the second PUCCH signal when sub frame i does not perform the power reduction, $P_1^{PUCCH}(i)$ is a transmitting power of the first PUCCH signal without performing the power reduction, and $P_3^{PUSCH\_ideal}(i)$ is a transmitting power of the third uplink signal when the power reduction is not performed. The power is a linear value, and i is a sub frame index of the first sub frame. The first power control parameter includes the) configuration parameters of $P_1^{PUCCH}(i)$.

In a first exemplary embodiment of Embodiment II, the first power control parameter further includes the configuration parameters of $P_2^{PUCCH,ideal}(i)$ and $P_1^{PUSCH\_UCI,ideal}(i)$.

In a second exemplary embodiment of Embodiment II, $P_{Max}$ is a linear value corresponding to 23 dBm.

Embodiment III

Figure 3:
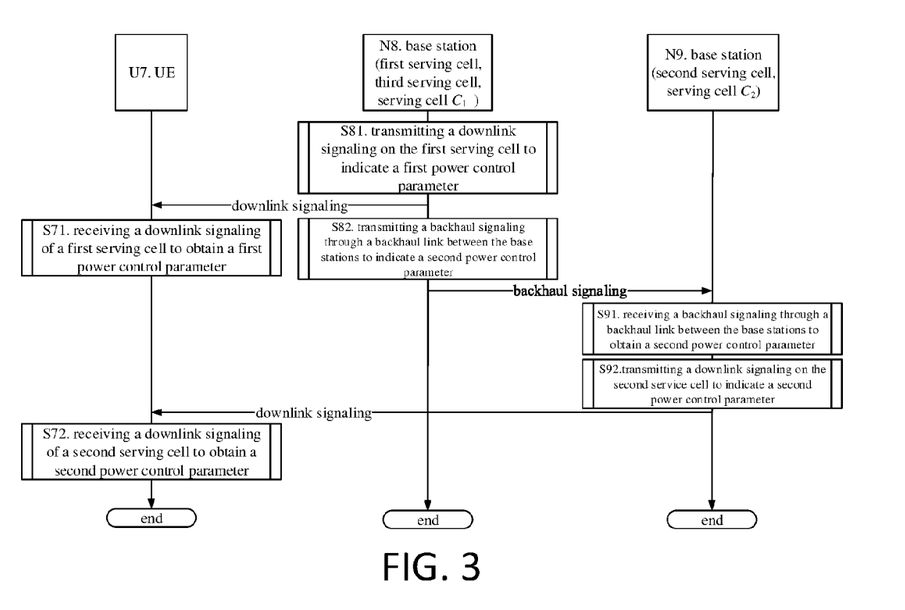
FIG. 3 is a flowchart of transmitting a backhaul signaling to exchange power control parameter through the interface between the base stations according to one embodiment of the present invention.

Embodiment III is a flowchart of transmitting a backhaul signaling to exchange power control parameter through the interface between the base stations, as shown in FIG. 3. In Embodiment III, the base station N8 is a maintaining base station of a first serving cell, a serving cell $C_1$ and a third serving cell, and the base station N8 is a primary base station. The base station N9 is a maintaining base station of a serving cell $C_2$ and a second serving cell, and the base station N6 is a secondary base station.

For the UE U7, in step S71, the method involves receiving a downlink signaling of a first serving cell to obtain a first power control parameter; in step S72, receiving a downlink signaling of a second serving cell to obtain a second power control parameter.

For the base station N8, in step S81, the method involves transmitting a downlink signaling on the first serving cell to indicate a first power control parameter; in step S82, the method involves transmitting a backhaul signaling through a backhual link between the base stations to indicate a second power control parameter.

For the base station N9, in step S91, the method involves receiving a backhaul signaling through a backhual link between the base stations to obtain a second power control parameter; in step S92, transmitting a downlink signaling on the second serving cell to indicate a second power control parameter.

In Embodiment III, the first power control parameter includes:
a first configuration parameter;
a third configuration parameter; and
a power control parameter $A_1$.
The second power control parameter includes:
a second configuration parameter; and
a power control parameter $A_2$.

The UE U7 determines the transmitting power of the PUCCH when the non power reduction is performed in the first serving cell according to the first configuration parameter, determines the transmitting power of the PUCCH signal when the non power reduction is performed in the second serving cell according to the second configuration parameter, determines the transmitting power of the PUSCH signal with UCI when the non power reduction is performed in the third serving cell according to the third configuration parameter, and determines the transmitting power of the PUSCH signal without UCI when the non power reduction is performed on the serving cell $C_k$ according to the power control parameter $A_k$, wherein k is 1 and 2.

Embodiment IV

Figure 4:
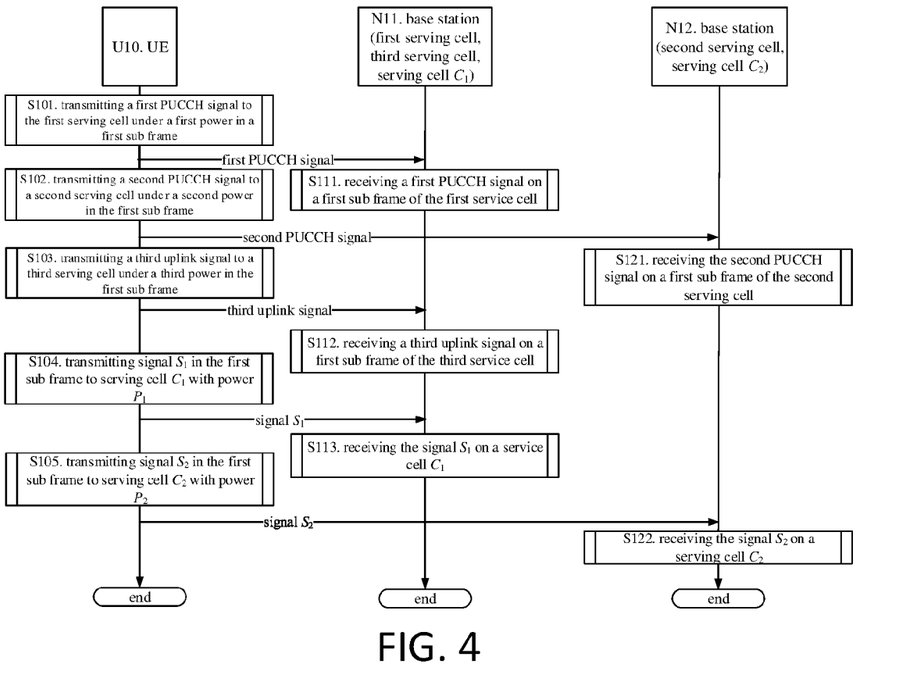
FIG. 4 is a flowchart of transmitting uplink signals on four cells simultaneously according to another embodiment of the present invention.

Embodiment IV is a flowchart of transmitting uplink signals on four cells simultaneously, as shown in FIG. 4. In Embodiment IV, the base station N11 is a maintaining base station of a first serving cell, a serving cell $C_1$ and a third serving cell, and the base station N11 is a primary base station. The base station N12 is a maintaining base station of a serving cell $C_2$ and a second serving cell, and the base station N12 is a secondary base station.

For the UE U10, in step S101, the method involves transmitting a first PUCCH signal to the first serving cell with a first power in a first sub frame; in step S102, the method involves transmitting a second PUCCH signal to a second serving cell with a second power in the first sub frame; in step S103, the method involves transmitting a third uplink signal to a third serving cell under a third power in the first sub frame; in the step S104, transmitting PUSCH signals $S_1$, $S_2$ without UCI in the first sub frame to the two serving cells $C_1$, $C_2$ respectively, and with powers $P_1$, $P_2$ respectively.

For the base station N11, in step S111, the method involves receiving a first PUCCH signal on a first sub frame of the first serving cell; in step S112, the method involves receiving a third uplink signal on a first sub frame of the third serving cell; in step S113, the method involves receiving the PUSCH signal $S_1$ without UCI on a first sub frame of the serving cell $C_1$.

For the base station N12, in step S121, method involves receiving the second PUCCH signal on a first sub frame of the second serving cell; in step S122, method involves receiving the PUSCH signal $S_2$ without UCI on a first sub frame of the serving cell $C_2$.

In Embodiment IV, the second power is a smaller value between a difference value and a second ideal power, and the difference value is obtained by subtracting the first power from a maximum total transmitting power. The first power is a transmitting power of the first PUCCH signal without performing a power reduction, and the second ideal power is a transmitting power of the second PUCCH signal without performing a power reduction. The third uplink signal is a PUSCH signal with a UCI, the third power is a smaller value between a difference value and a third ideal power, and the difference value is obtained by subtracting the first power and the second power from the maximum total transmitting power. The third ideal power is a transmitting power of the third uplink signal without performing the power reduction. The serving cells $C_1$, $C_2$ does not include the third serving cell. A sum of the powers $P_1$, $P_2$ is not greater than a difference value obtained by subtracting the first power, the second power and the third power from the maximum total transmitting power. The power is a linear value. The first power control parameter includes a configuration parameter of the first power.

In an exemplary embodiment:
$P_1 = w \cdot P_1^{ideal}$
$P_2 = w \cdot P_2^{ideal}$.
$P_k^{ideal}$ is a transmitting power of $S_k$ when the power reduction is not performed. w is configured by the first power control parameter indicated by the downlink signaling transmitted by the first serving cell. k is a positive integer from 1 to 2.

Embodiment V

Figure 5:
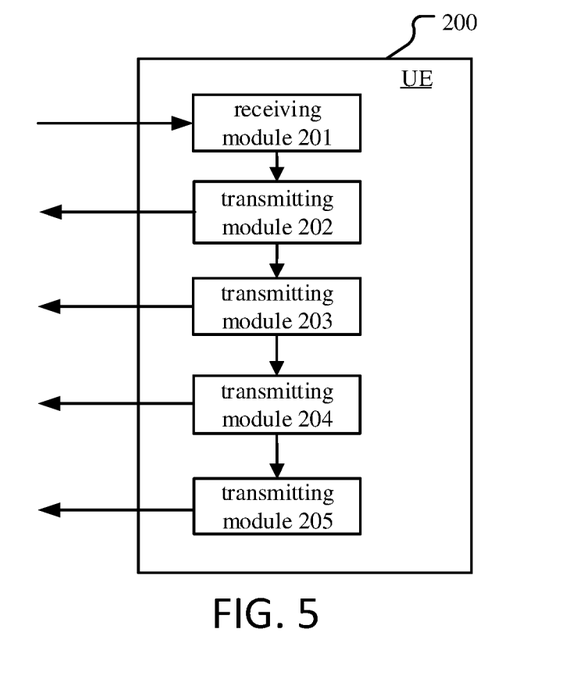
FIG. 5 is a block diagram illustrating a processing device in an user equipment according to one embodiment of the present invention.

Embodiment V is a block diagram illustrating a processing device in a user equipment, as shown in FIG. 5. In FIG. 5, the processing device 200 in the UE mainly includes a receiving module 201, a transmitting module 202, a transmitting module 203, a transmitting module 204 and a transmitting module 205.

The receiving module 201 is used for receiving a downlink signaling of a first serving cell to obtain a first power control parameter; the transmitting module 202 is used transmitting a first PUCCH signal to the first serving cell with a first power in a first sub frame; the transmitting module 203 is used for transmitting a second PUCCH signal to a second serving cell with a second power in the first sub frame; the transmitting module 204 is used transmitting a third uplink signal to a third serving cell with a third power in the first sub frame; the transmitting module 205 is used for transmitting PUSCH signals $S_1$, $S_2$, ..., $S_K$ without UCI to K serving cells $C_1$, $C_2$, ..., $C_K$ respectively with powers $P_1$, $P_2$, ..., $P_K$ in the first sub frame.

In Embodiment V, the second power is a smaller value between a difference value and a second ideal power, and the difference value is obtained by subtracting the first power from a maximum total transmitting power. The first power is a transmitting power of the first PUCCH signal without performing a power reduction, and the second ideal power is a transmitting power of the second PUCCH signal without performing a power reduction. The power is a linear value. The third uplink signal is a PUSCH with a UCI, the third power is a smaller value between a difference value and a third ideal power, the difference value is obtained by subtracting the first power and the second power from the maximum total transmitting power. The third ideal power is a transmitting power of the third uplink signal without performing the power reduction; the power is a linear value. The K serving cells do not include the third serving cells, the k is a positive integer from 1 to K, and the K is a positive integer. A sum of the power $P_1, P_2, \ldots, P_K$ does not exceed a difference value obtained by subtracting the first power, and the second power and the third power from the maximum total transmitting power. The power $P_k$ is the product of the power reduction factors w and $P_k^{ideal}$ of the first sub frame. $P_k^{ideal}$ is a transmitting power of $S_k$ when the power reduction is not performed. w is configurable. The downlink signaling includes a radio resource control (RRC) signaling and a physical layer signaling. The first power control parameter includes a configuration parameter of the first power.

In a first exemplary embodiment, the physical layer signaling is a dynamic control indicator (DCI) format 3 or 3A.

Embodiment VI

Figure 6:
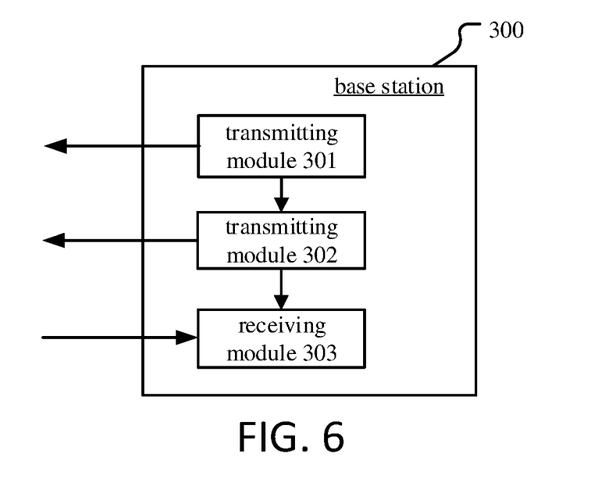
FIG. 6 is a block diagram illustrating a processing device in a base station equipment according to one embodiment of the present invention.

Embodiment VI is a block diagram illustrating a processing device in a base station equipment according to one embodiment of the present invention, as shown in FIG. 6. In FIG. 6, the base station equipment 300 mainly includes a transmitting module 301, a transmitting module 302 and a receiving module 303.

The transmitting module 301 is used for transmitting a downlink signaling to indicate a first power control parameter; the transmitting module 302 is used for transmitting a backhaul signaling through a backhual link between the base stations to indicate a second power control parameter; the receiving module 303 is used for receiving a first PUCCH signal.

In Embodiment VI, a transmitting power of the first PUCCH signal is determined according to the first power control parameter, and the second power control parameter is used for configuring an uplink transmitting power of a transmitter of the first PUCCH signal on other serving cell. The downlink signaling is a radio resource control (RRC) signaling and a physical layer signaling.

In a first exemplary embodiment of Embodiment VI, the physical layer signaling includes a dynamic control indicator (DCI) format 3 or 3A.

Embodiment VII

Figure 7:
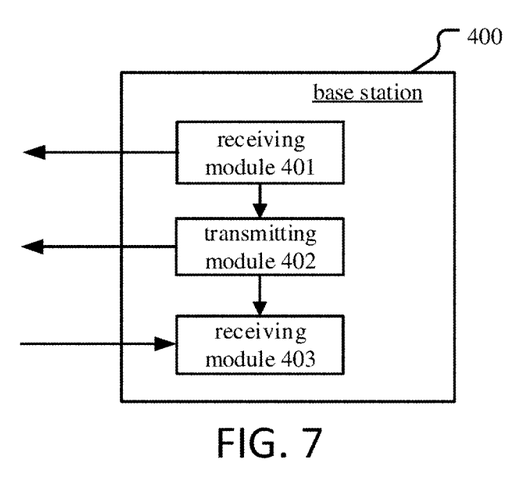
FIG. 7 is a block diagram illustrating a processing device in a base station equipment according to another embodiment of the present invention.

Embodiment VII is a block diagram illustrating a processing device in a base station equipment according to another embodiment of the present invention, as shown in FIG. 7. In FIG. 7, the base station equipment 400 mainly includes a receiving module 401, a transmitting module 402 and a receiving module 403.

The receiving module 401 is used for receiving a backhaul signaling through a backhaul link X2 between the base stations to obtain a second power control parameter; the transmitting module 402 is used for transmitting a downlink signaling to indicate the second power control parameter; the receiving module 403 is used for receiving a second PUCCH signal.

Wherein the second power control parameter includes a configuration parameter of a transmitting power when the power reduction for the second PUCCH signal is not performed. The downlink signaling is a radio resource control (RRC) signaling.

Those of ordinary skill will be appreciated that all or part of the above method may be accomplished by a program instructing related hardware. The program may be stored in a computer-readable storage medium, such as read-only memory, a hard disk or CD-ROM. Alternatively, all or part of the steps of the above-described embodiments may be accomplished by one or more integrated circuits. Accordingly, each module in the above-described embodiments may be accomplished by hardware implementation, or may also be realized by the form of software modules. The present invention is not limited to any particular form of combination of software and hardware.

Although the present invention is illustrated and described with reference to specific embodiments, those skilled in the art will understand that many variations and modifications are readily attainable without departing from the spirit and scope thereof as defined by the appended claims and their legal equivalents.

What is claimed is:

1. A method for multiple-serving-cell connectivity in a UE, comprising:
    Step A: receiving a downlink signaling of a first serving cell to obtain a first power control parameter;
    Step B: transmitting a first PUCCH signal to the first serving cell with a first power in a first sub frame; and
    Step C: transmitting a second PUCCH signal to a second serving cell with a second power in the first sub frame;
    wherein the second power is a smaller value between a difference value and a second ideal power, the difference value is obtained by subtracting the first power from a maximum total transmitting power; the first power is a transmitting power of the first PUCCH signal without performing a power reduction, and the second ideal power is a transmitting power of the second PUCCH signal without performing a power reduction; the power is a linear value; the first power control parameter comprises a configuration parameter of the first power.

2. The method for multiple-serving-cell connectivity in the UE according to claim 1, wherein the method further comprises:
    Step D: transmitting a third uplink signal to a third serving cell with a third power in the first sub frame;
    wherein the third uplink signal is a PUSCH signal with a UCI, the third power is a smaller value between a difference value and a third ideal power, and the difference value is obtained by subtracting the first power and the second power from the maximum total transmitting power; the third ideal power is a transmitting power of the third uplink signal without performing the power reduction.

3. The method for multiple-serving-cell connectivity in the UE according to claim 1, wherein the method further comprises:
    Step E: transmitting PUSCH signals $S_1, S_2, \ldots, S_K$ without UCI in the first sub frame to K serving cells $C_1, C_2, \ldots, C_K$ respectively, and with powers $P_1, P_2, \ldots, P_K$ respectively;
    wherein the K serving cells do not comprise the third serving cells; a sum of the powers $P_1, P_2, \ldots, P_K$ does not exceed a difference value obtained by subtracting the first power, the second power and the third power from the maximum total transmitting power;

if the step D does not exist, the third power is 0, the k is a positive integer from 1 to K, and the K is a positive integer; the power is a linear value.

4. The method for multiple-serving-cell connectivity in the UE according to claim 3, wherein the maximum total transmitting power is a linear value corresponding to 23 dBm.

5. The method for multiple-serving-cell connectivity in the UE according to claim 3, wherein the power $P_k$ is the product of power reduction factors w and $P_k^{ideal}$ of the first sub frame; the $P_k^{ideal}$ is a transmitting power of the $S_k$; w is configurable.

6. The method for multiple-serving-cell connectivity in the UE according to claim 1, wherein the method before the step C comprises:

Step C0: receiving a downlink signaling of a second serving cell to obtain a second power control parameter;

wherein the second power control parameter comprises a configuration parameter of the second ideal power.

7. The method for multiple-serving-cell connectivity in the UE according to claim 1, wherein the first serving cell is a primary serving cell of the UE.

8. The method for multiple-serving-cell connectivity in the UE according to claim 1, wherein the first power control parameter comprises:

a configuration parameter of the second ideal power;

a configuration parameter of the third ideal power; and a configuration parameter of the $P_k^{ideal}$.

9. An user equipment, comprising:

a first module, for receiving a downlink signaling of a first serving cell to obtain a first power control parameter;

a second module, for transmitting a first PUCCH signal to the first serving cell with a first power in a first sub frame; and a third module, for transmitting a second PUCCH signal to a second serving cell with a second power in the first sub frame;

wherein the second power is a smaller value between a difference value and a second ideal power, and the difference value is obtained by subtracting the first power from a maximum total transmitting power; the first power is a transmitting power of the first PUCCH signal without performing a power reduction, and the second ideal power is a transmitting power of the second PUCCH signal without performing a power reduction; the power is a linear value; the first power control parameter comprises a configuration parameter of the first power.

10. The user equipment according to claim 9, wherein the first serving cell is a primary serving cell of the UE.

11. The user equipment according to claim 9, further comprising:

a fourth module, for transmitting a third uplink signal to a third serving cell with a third power in the first sub frame;

wherein the third uplink signal is a PUSCH signal with a UCI, the third power is a smaller value between a difference value and a third ideal power, and the difference value is obtained by subtracting the first power and the second power from the maximum total transmitting power; the third ideal power is a transmitting power of the third uplink signal without performing the power reduction.

12. The user equipment according to claim 9, further comprising:

a fifth module, transmitting PUSCH signals $S_1, S_2, \ldots, S_K$ without UCI in the first sub frame to K serving cells $C_1, C_2, \ldots, C_K$ respectively, and with powers $P_1, P_2, \ldots, P_K$ respectively;

wherein the K serving cells do not comprise the third serving cells; a sum of the powers $P_1, P_2, \ldots, P_K$ does not exceed a difference value obtained by subtracting the first power, the second power and the third power from the maximum total transmitting power; if the step D does not exist, the third power is 0, the k is a positive integer from 1 to K, and the K is a positive integer; the power is a linear value.

13. The user equipment according to claim 12, wherein the maximum total transmitting power is a linear value corresponding to 23 dBm.

14. The user equipment according to claim 12, wherein the power $P_k$ is the product of power reduction factors w and $P_k^{ideal}$ of the first sub frame; the $P_k^{ideal}$ is a transmitting power of the $S_k$; w is configurable.

15. The user equipment according to claim 9, wherein the first module is further used for receiving a downlink signaling of a second serving cell to obtain a second power control parameter;

wherein the second power control parameter comprises a configuration parameter of the second ideal power.

16. The user equipment according to claim 9, wherein the first power control parameter comprises:

a configuration parameter of the second ideal power;

a configuration parameter of the third ideal power; and a configuration parameter of the $P_k^{ideal}$.

* * * * *